United States Patent [19]

Rogers et al.

[11] Patent Number: 4,905,897

[45] Date of Patent: Mar. 6, 1990

[54] FIELD SPRAYER NOZZLE PATTERN MONITOR

[75] Inventors: Ramon B. Rogers, 240-103rd Street, Saskatoon, Saskatchewan, Canada, S7N 1X7; James A. Baker, Edmonton, Canada

[73] Assignee: Ramon Barry Rogers, Saskatoon,, Canada

[21] Appl. No.: 208,215

[22] Filed: Jun. 17, 1988

[51] Int. Cl.$^4$ .......................... B05B 9/00; B05B 15/00
[52] U.S. Cl. ...................................... 239/1; 73/861.18; 239/72; 239/172; 239/391; 340/606; 340/608
[58] Field of Search .................. 239/63, 71, 72, 74, 239/102.1, 102.2, 602, 172, 390, 391; 73/861.18; 340/606, 608

[56] References Cited

U.S. PATENT DOCUMENTS

| | | | |
|---|---|---|---|
| 2,153,254 | 4/1939 | Johnston et al. | 73/861.18 X |
| 2,698,929 | 1/1955 | Greacen et al. | 340/608 X |
| 3,580,092 | 5/1971 | Scarpa | 340/606 X |
| 3,990,292 | 11/1976 | Stern | 73/37.7 |
| 4,193,356 | 3/1980 | Vehe | 340/608 X |
| 4,197,995 | 4/1980 | Campbell et al. | |
| 4,569,227 | 2/1986 | Adolph | 73/119 A |

FOREIGN PATENT DOCUMENTS 2529808  1/1984  France .............................. 340/608

OTHER PUBLICATIONS

Brochure–Century Electronic Nozzle.

*Primary Examiner*—Andres Kashnikow
*Attorney, Agent, or Firm*—Adrian D. Battison; Stanley G. Ade; Murray E. Thrift

[57] ABSTRACT

A field sprayer nozzle monitor comprises a sensor head in the form of an L-shaped horn device which is clamped onto the nozzle cap by way of a slot which receives the fin of the nozzle cap. The horn includes a mouth which receives sound from the spray nozzle and transmits it to a microphone protected with the horn. A central processor unit receives signals from each of the sensors in turn and processes those to compare with a predetermined calibration signal to determine which nozzles are blocked or faulty. The selection between two different frequencies can be made for different nozzle types. A dynamic averaging system is used to accommodate changes which take place at all nozzles which are independent of fault at the nozzle.

28 Claims, 3 Drawing Sheets

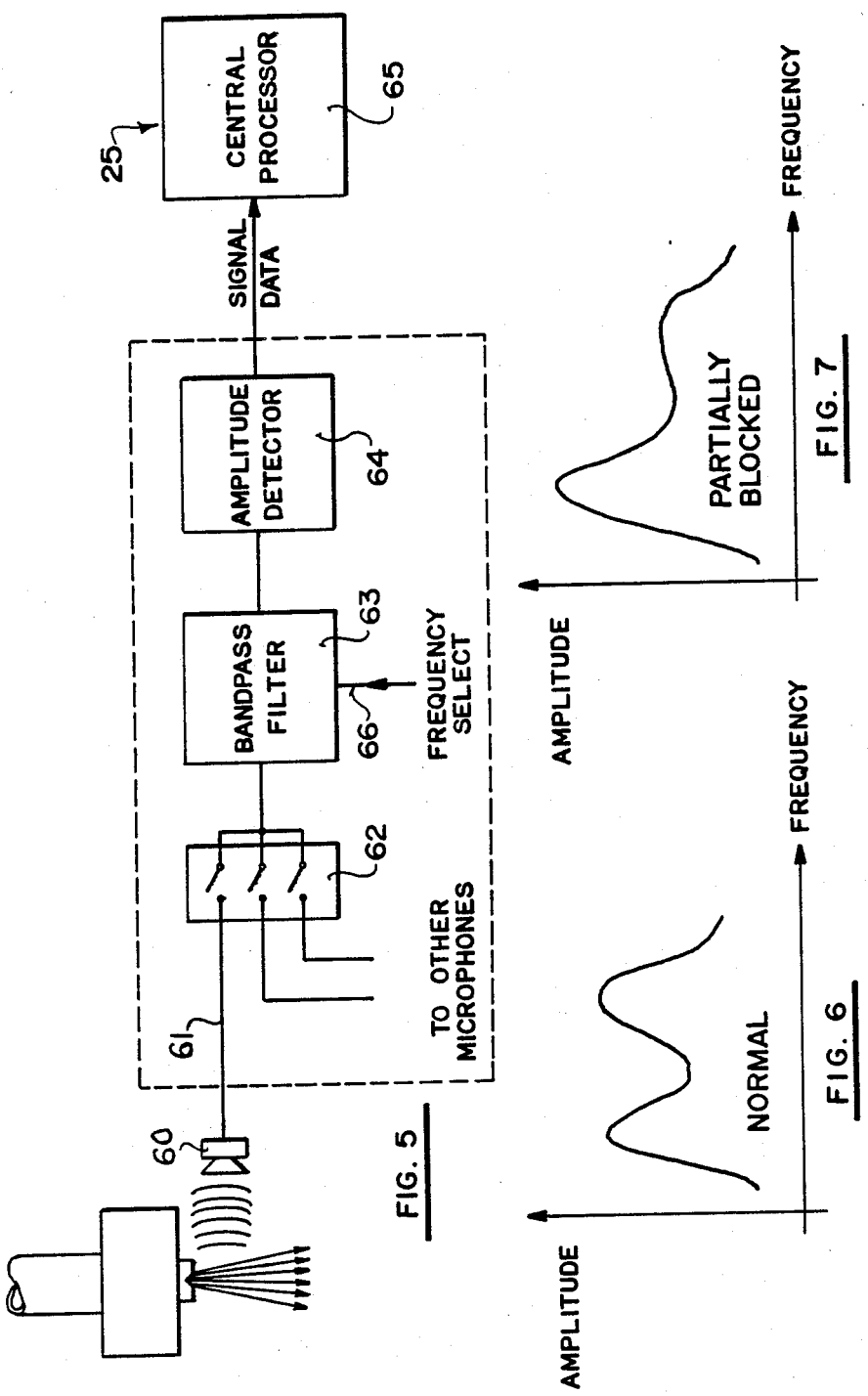

FIELD SPRAYER NOZZLE PATTERN MONITOR

BACKGROUND OF THE INVENTION

This invention relates to a monitor for a nozzle of a sprayer device which is particularly but not exclusively designed for use with field sprayers of a type in which the nozzle is shielded by suitable cover arrangements from the effects of wind and hence is directly not visible to an operative of the sprayer vehicle.

Field sprayers, as is well known, include a suitable vehicle arrangement which carries a tank of the liquid to be sprayed. The vehicle includes booms which extend outwardly to the sides of the vehicle often supported on ground wheels with spray nozzles arranged along the lengths of the booms at spaced positions so as to provide a spray pattern which covers the ground over which the booms move. The liquid is pumped from the container to each of the nozzles. It is of course very important to ensure that each of the nozzles is properly operating since it is essential to control accurately the proper consistent application of a required amount of the liquid over the ground. If one or more of the nozzles fails to operate at all or operates unevenly, one part of the ground will of course therefore not receive its proper dose of the liquid and thus the proper treatment of the crop in that area will be omitted.

Conventional sprayers in which all or most of the nozzles are open to view can be monitored by visual inspection by the operator. Even in sprayers of this type, the operator may overlook a faulty nozzle or one of the nozzles which are not open to view for example those directly behind the container may be faulty and hence may not be visible.

In order to obtain improved spraying efficiency and to enable spraying in higher wind velocities, recent developments have led to various designs of shrouded sprayers for example of the type shown in U.S. Pat. No. 4,646,971 (R. B. Rogers). In sprayers of this type, the spray nozzles are totally hidden from view and hence it is not possible to visually determine whether each of the nozzles is properly operating without the operator leaving the cab and making a direct inspection. Thus one or more of the spray nozzles can become blocked and inoperative during the sprayer operation thus leading to bands of unsprayed or oversprayed areas being formed across the ground.

Various techniques of monitoring the operation of the nozzles are available but it is of course necessary to manufacture a monitoring device which is economically acceptable in the relatively large numbers necessary for monitoring each of the nozzles on a large sprayer which may have up to 60 nozzles in a ninety eight foot width.

Several commercial nozzle monitor devices are available on the marketplace which operate by detecting the volume of fluid flowing to the nozzle so that on a nozzle becoming blocked so as to reduce the flow by a predetermined amount generally the order of twenty percent (20%), the flow monitor detects the change and indicates a fault.

However tip malfunction can exist in many cases with little or no change in flow by a partial blockage of the tip which causes the fluid to flow through only one side of the nozzle thus increasing flow in one area while reducing the flow in another area so that the pattern is faulty. Such faults would not be detected by the flow monitor. Furthermore such faults can be seriously damaging in that modern chemicals in many cases require very accurate levels of application in that an excess amount can cause significant damage to the crop or to the soil.

A device was proposed by Century Engineering around 1975 in which a sensor was attached to the nozzle to detect vibration at that point. Such vibrations were generated by vibration of the boom and by movement of fluid to and through the nozzle. The vibration sensor was however ineffective and was withdrawn from the market at around that time.

SUMMARY OF THE INVENTION

It is one object of the present invention, therefore, to provide a sprayer monitoring device for monitoring the nozzles of a field sprayer which can monitor each of the nozzles and yet can be manufactured at an economically acceptable price.

According to the invention, therefore, there is provided an apparatus for detecting faulty operation of one of a plurality of spray nozzles comprising a plurality of microphones, means for mounting each microphone adjacent a respective one of the nozzles, each of said microphones being arranged to generate an electrical signal in response to sound emitted by a spray of liquid exiting the nozzle, central detector means arranged to receive said electrical signals and to detect a deviation any one of said electrical signals from a predetermined normal signal by a value greater than a predetermined value so as to detect a fault in the operation of the nozzle associated with said one of said signals, and display means for indicating said fault.

The invention therefore uses the technique of detecting the sound of the exiting liquid spray to determine the proper operation of each of the nozzles.

Preferably the microphone is mounted in a suitable moulded body which can be mounted directly upon the nozzle and provides an enhanced sound communication to the microphone and yet protects the microphone from contact with the liquid sprayed from the nozzle.

Furthermore the central detection device is arranged to analyze the electrical signals issued from the microphones and to provide an indication of faulty nozzles while accommodating an adjusted variation in the volume of liquid sprayed through the nozzles and accommodating changes in nozzle tip diameter.

The device therefore monitors or detects the sound created by the spray of liquid exiting the spray nozzle and not the sound generated by the nozzle itself. It has been noted that the amplitude spectrum of the sound generated by the spray of liquid changes for different nozzle patterns and thus the detection of a change in sound amplitude at a particular frequency within the spectrum provides an indication of a change of the nozzle pattern which is very sensitive and very much more sensitive than previous devices.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS:

FIG. 5 is a block diagram of the electrical signal processing procedure.

FIG. 6 and 7 are graphs of the frequency spectrum of the sound emitted by the spray when operating normally and when partially blocked.

In the drawings like characters of reference indicate corresponding parts in the different figures.

DETAILED DESCRIPTION

Figure 1:
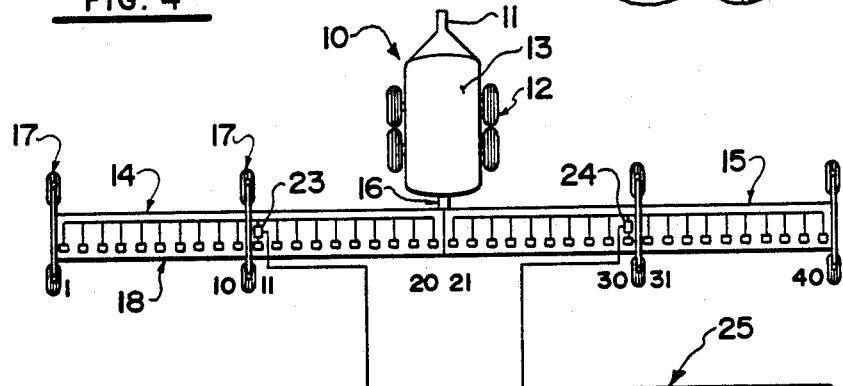
FIG. 1 is a schematic illustration of a field sprayer incorporating a nozzle monitoring system according to the invention, the central detection device of the system being shown on a much enlarged scale.
Figure 1:
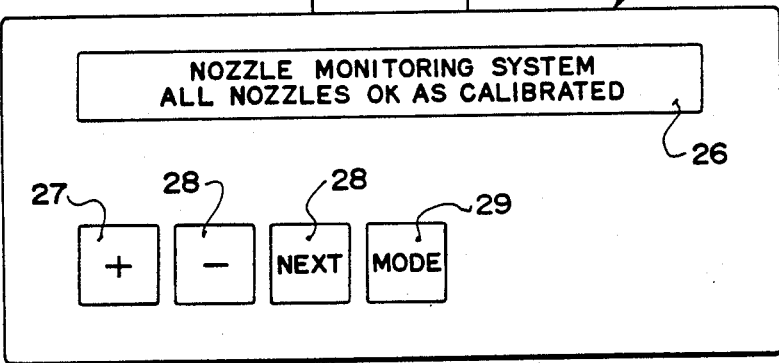

The field sprayer of FIG. 1 comprises a vehicle 10 having a hitch 11 for attachment to a suitable tractor vehicle. The vehicle includes ground wheels 12 for supporting it from the ground for transportation of a tank 13 containing a liquid to be sprayed.

A pair of booms 14 and 15 extend outwardly to each side of the vehicle and are attached to the vehicle by strut connections 16 so that the booms are transported with the vehicle across the ground to be sprayed. The booms are supported on ground wheels 17. The booms are of the type shown and claimed in prior U.S. Pat. No. 4,646,971 in which there is provided a shroud or cover 18 fully covering the tips of the nozzles 19 so that the spraying effect takes place beneath the shroud which protects the spraying effect from the disturbance of wind currents surrounding the spray boom. The details of the construction of this device are fully explained in the above patent and will not be repeated here. It suffice to say that, as the spraying effect takes place fully beneath the shroud, it is hidden from view and hence the proper spray pattern emitted by the nozzle tips cannot be directly visually observed by the operator.

Attached to the device, therefore, there is provided a nozzle monitoring system including a plurality of monitoring heads 22, each of which has a separate electrical connection to a respective one of a pair of collector/processors 23 and 24 each positioned on the boom so as to be substantially central to the heads which it services. Thus the collector/processor 23 is mounted substantially centrally of the left hand boom between the heads numbered 1 through 10 and 11 through 20. Similarly the collector/processor 24 is positioned substantially centrally of the right hand boom between the heads numbered 21 through 30 and 31 through 40. Each of the collector/processors 23 and 24 communicates to the central processor unit 25 which is shown on a much enlarged scale but in practice will be a manually transportable unit which can be positioned suitably within the tractor vehicle for observation by the operative.

The central processing unit 25 includes a display 26 on which the various messages generated by the microprocessor will appear as discussed hereinafter. Furthermore the central processor unit 25 has four manually actuable keys 27, 28, 29 and 30 labelled "+", "−", "NEXT" and "MODE" which are used by the operator to calibrate the central processing unit and select various displays of monitor results.

The details of the microprocessor controlled central processing unit are not shown since these will be well apparent to one skilled in the electronics art from the later description of the operation of the device.

Figure 4:
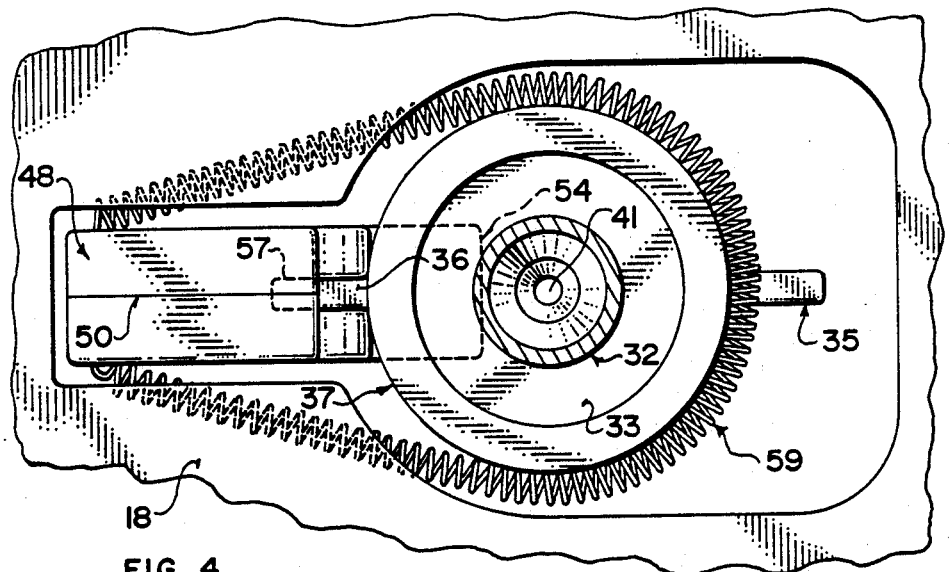
FIG. 4 is a cross sectional view of the nozzle and monitoring head of FIG. 2 along lines 4—4 of FIG. 2.
Figure 2:
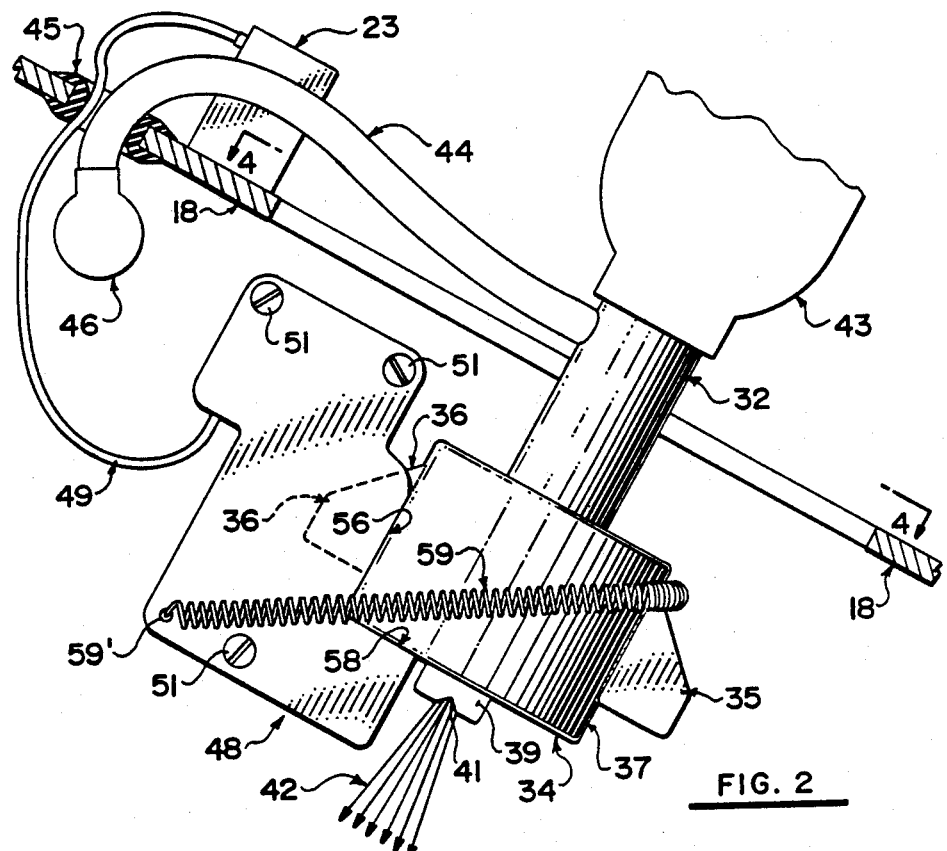
FIG. 2 is a side elevational view of a nozzle and attached monitoring head of the sprayer of FIG. 1.
Figure 3:
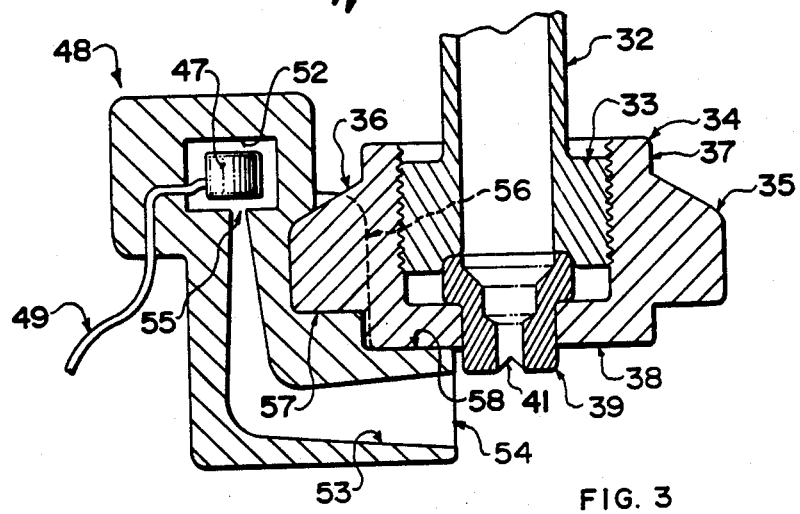
FIG. 3 is a cross sectional view of the nozzle and monitoring head of FIG. 2.

Turning now to FIGS. 2, 3, and 4, there is shown in more detail an individual nozzle monitoring head mounted upon an individual nozzle. The nozzle comprises a nozzle support pipe 32 which has a screw threaded end piece 33 onto which is attached a nozzle cap 34 by way of suitable coupling. In the drawing is shown a screw thread coupling but in practice most such nozzle caps of a conventional nature use a bayonet type coupling. The nozzle cap has a pair of fins 35 and 36 extending outwardly from an exterior cylindrical surface 37 thereof. An inwardly turned flange 38 of the nozzle cap clamps a nozzle tip 39 against an end face of the support pipe 32. The nozzle includes a suitable orifice 41 for generating a required spray pattern indicated in FIG. 2 at 42. The nozzle tip can be removed simply by unscrewing the cap 34 so that the nozzle tip can be cleaned, replaced if damaged or can be replaced for an alternative spray pattern depending upon the material to be sprayed.

The fins 35 and 36 extend radially outwardly from the cylindrical body and are provided for grasping by the hand of the user to assist in screwing and unscrewing of the cap on the nozzle. The pipe 32 is mounted upon a suitable mounting bracket 43 and in the construction shown the whole nozzle including the pipe 32 can be pivoted about the mounting bracket 43 to allow the nozzle to be withdrawn from the interior of the shroud 18 for servicing. A liquid to be sprayed is supplied to the pipe 32 through a supply line 44 which passes through an opening 45 in the surface of the shroud. A supply pipe 46 passes along the boom from the supply tank 13 and is provided on the inner surface of the shroud 18.

The construction of the shroud, nozzle and nozzle support as described above is substantially conventional in form and the monitoring head has been designed for attachment to a nozzle of this general type. Although illustrated with a shrouded type spraying arrangement, the nozzle head can be mounted on any suitable nozzle arrangement which generally includes the fin construction of the nozzle cap but in other cases an alternative mounting construction may be employed to accommodate a nozzle cap of an alternative arrangement.

The monitor or sensing head comprises a microphone 47 embedded within a plastics horn arrangement indicated at 48. An electrical wire connection from the microphone is indicated at 49 and passes out through an opening in the horn 48 and can be threaded through the opening 45 in the shroud for connection to the collector/processor 23. It will be appreciated that each of the sensor heads includes an individual connection wire 49 each of which is arranged to be of a length so that it can connect from the position on the boom to the collector/processor 23. The further connections are omitted from the illustration of FIG. 2 for convenience.

The horn 48 is formed in two molded halves joined at a centre line 50 and connected by screws 51. Within the body is formed a recess 52 for receiving the microphone 47 together with a horn channel 53. The body is generally L-shaped so that the microphone is provided at the upper end of the leg of the L and the channel 53 extends down the leg of the L and across the base of the L to open on an outer surface of the body at a mouth 54 facing outwardly from the toe of the L-shape. The channel 53 gradually converges from the open mouth 54 to an end 55 adjacent the microphone so as to concentrate sound collected at the mouth 54 to maximize that sound to be sensed by the microphone 47.

The L-shape of the horn body 48 provides a first flat surface 56 which can lie against the outer surface 37 of the cap 34. A slot 57 is formed in the surface 56 which is configured just to receive the fin 36 of the cap 34. An upper surface 58 of the base of the L-shape lies along an undersurface of the cap 34 so that the open mouth breaks out at a position closely adjacent a nozzle tip 39 and lies as close as possible to the nozzle without interfering with the spray pattern 42.

The horn body is held in place upon the cap by a spring 59 which connects to an opening 59 at a bottom corner of the L-shape and extends therefrom around the cap 34 to engage the interconnection between the surface 37 and the upper edge of the fin 35 thus holding the upper edge of the spring in the recess defined therebetween. The spring thus acts to pull the surfaces 56 and 58 of the L-shape against the cap 34 with the cooperation between the slot 57 and the fin 36 preventing sideways movement of the sensor relative to the cap.

It will be noted from FIG. 2 that the nozzle is inclined from the vertical and in practice the nozzle is arranged to project forwardly from an inclined rear surface of the shroud in a direction generally at right angles to the shroud surface. The sensor is mounted on the upper side of the nozzle so that gravity tends to pull any liquid dripping from the nozzle away from the sensor to ensure it is kept as dry as possible.

Turning now to the central processor unit and its operation, a block diagram is illustrated in FIG. 5. In FIG. 5 the microphone is indicated generally at 60 and conducts an electrical signal therefrom through an electrical wire 61 to a multiplexing switching circuit in the central processor unit indicated at 62. The multiplex circuit 62 is able to select any one of up to 24 sensors connected to the device on command from the central processor. The electrical signal from the selected sensor or microphone 60 is then processed through a band pass filter 63 and an amplitude detector 64. The output of the amplitude detector is transmitted to a microprocessor 65 of the central processing unit.

The frequency of the band pass filter can be selected by an input 66 during a calibration mode in dependence upon the size of the orifice in the nozzle and hence the characteristic frequency of the sound produced by the spray exiting the nozzle. The central microprocessor contains electric circuitry to be able to request information from the collector/processor and to perform calculations and comparisons based upon the signal data transmitted from the amplitude detector. From all of the sensors being used and then display the results of such comparisons on display for interpretation by the operator of the spraying machine. Circuit and software details of the central processor are not included here because they are within the skill of one in the art.

There are two modes of operation of the nozzle monitor system, a calibration mode and a monitoring mode. The microprocessor decision chart for calibration mode is as follows:
  Do until all sensors have been read select next sensor
    read sensor signal data
  Average signal for all sensors connected
  Do until all sensor signal data is normalized calculate
    and save a normalization gain value for each sensor
    so that when a sensor signal data is multiplied by
    the normalization value the result will be a number 10.

The Microprocessor Decision Chart for Monitor Mode is as follows:
  select next sensor
  read sensor signal data
  multiply and save sensor signal data by normalization gain value average normalized sensor signal data for all sensors connected compare this sensor normalized value to average normalized value
  If deviation from average is greater than selected limits then send indication of faulty nozzle to display
  Continue with next sensor The sensitivity of microphones and the absolute sound levels produced by different nozzles varies considerably so a signal formalization technique is used during calibration to compensate for these gain changes.

During monitoring mode, the normalization factors are applied to individual sensor signals to return a consistent signal value. In normal operation the general average signal level may change due to changes in operating pressure for example so a dynamic average of the normalized values is used as a reference for comparison against individual sensor signals.

MICROPROCESSOR DECISION CHART IN MONITOR MODE
  selects sensor
  reads sensor
  averages past 3 readings
  drops 3rd reading replaces with new reading
  compares to standard
  calculates deviation from standard
  compares to sensitivity setting over - alarm
  sends identification of nozzle to the display and activates the audio alarm
  freeze display until new information is forwarded under - okay proceed
  goes to next sensor
  after each sensor has been read, the deviation from the standard for the deviation (referred to as dynamic averaging)
  selects next tip
IN CALIBRATE MODE
  selects and identifies sensor
  reads 4 times and averages
  reads another 4 times, averages and compares to first
  if within 50% NO
    NO—reads another 4 times and compares to previous
    YES—stores as standard for that sensor
  notifies display that the tip is calibrated
  proceeds to next nozzle
  after all nozzle are initialized goes to monitor mode The mode key 30 on the central processor unit operates to switch the device between the monitor mode and the calibrate mode. Generally the processor is first switched on it starts by displaying the monitor mode.

The NEXT key both in the calibrate and monitor mode acts to step the display to a further display in that mode. The + and − keys are used in the calibrate mode to alter the sensitivity of the device by varying the percentage difference necessary between the measured value and the normal value of a particular sensor to actuate the alarm. Thus actuation of the + key acts to increase the percentage difference necessary and actuation of the − key acts to decrease the difference necessary with the sensitivity being displayed on the display 26.

In the monitor mode, three separate displays can be obtained by actuation of the NEXT key as follows:
1. Nozzle information
2. Calibration values
3. Sensor values When the system is normally in use, the device will normally display the nozzle information. When this display is showing, the device will display one of the following "ALL NOZZLES OKAY AS CALIBRATED" which indicates that the nozzles are all operating satisfactorily with no plugged nozzles.

"NOZZLE FAULT" this will be followed by the number associated with the number associated with the sensor concerned. This display can be obtained by a malfunctioning nozzle or by one of the nozzle sensors being disconnected or failed.

"SENSOR PROCESSOR IS DISCONNECTED" if the central processor unit cannot get sensor values from the collector/processor 23 or 24 then the disconnected message will occur.

Actuation of the NEXT key in the monitor mode, will as stated above, provide details concerning the calibration values and the sensor values. These are positioned on the display so that the values for all forty sensors can be displayed at once. The calibration for each sensor is calculated during the calibration of the monitoring system and represents the following:

$$\text{CALIBRATION VALUE} = \frac{\text{SENSOR VALUE} \times 10}{\text{Average sensor value}}$$

Calibration values will be "10" if equal to the average sensor value. If calibration values are smaller than "7" or larger than "13" then that nozzle tip or sensor is causing readings greater than 30 per cent from the average and should be checked. When "99" is displayed this indicates a fault either the sensor processor 23 or 24 or with the nozzle (nozzles that were plugged during calibration will be displayed as "99").

The sensor values or the actual values being read by the monitoring system for each sensor.

The dynamic averaging referred to in the microprocess and decision chart enables the device to accommodate without recalibration changes in sprayer pressure or other changes which alter the sound emitted by all of the nozzles. Thus for example where it is required to alter the sprayer pressure for a change of operating conditions, all of the nozzles will change and thus generate a deviation signal at the central processor unit. After each cycle of sensing from each of the sensors is complete, the average is thus calculated and used to modify the "normal signal" stored for each of the nozzle sensors.

The spectrum of sound emitted by a nozzle tip is shown in FIGS. 6 and 7. It has been noted that the different nozzle tips available have the spectrum shifted in frequency, of course depending upon the size of the orifice and the spray pattern generated. The microprocessor in order to accommodate such range of different nozzle tips is therefore arranged to incorporate a further step in the calibration mode in which subsequent to the selection of a standard for the first sensor at a first frequency of detection, it repeats the process for a second frequency of detection different from that of the first. This is obtained by adjusting the Bandpass Filter to pass a different frequency in the spectrum. It then compares the standard for the first frequency with the standard for the second frequency and selects that frequency which provides a standard having a greater magnitude. That frequency is then set in the Bandpass Filter and used for all calculations and sensing with the nozzle series employed at that time. On replacement of the nozzle tips with an alternative style, the calibration must be repeated so that the microprocessor can then select the frequency most suitable for the new nozzle tip series. The frequencies are selected in the range of frequencies available to accommodate all tips between the smallest tips and the largest tips.

In an alternative arrangement, the selection of the two frequencies can be carried out manually by a switch on the central processor unit so that the microprocessor follows the decision chart previously set forth. In this case it is necessary for the operator to know which frequency should be used with which type of nozzle tips so that the required frequency can be selected.

The nozzle sensor thus described above can be used by adjusting the percentage deviation accepted to monitor at different levels of sensitivity. The monitor can be used to detect minor deviations in spray pattern caused for example by small particles collecting in the nozzle or can be used merely to detect complete plugging of the nozzle. The choice of sensitivity will be available to the operator in dependence upon the particular requirements of the material being sprayed or the required effect upon the ground conditions.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. Apparatus for detecting faulty operation of one of a plurality of spray nozzles each said spray nozzle having a nozzle tip arranged to generate a liquid spray pattern which projects from the nozzle tip in a spray direction, said apparatus comprising a plurality of microphones, each microphone comprising a support body, a transducer mounted in said body and arranged to generate electrical signals in dependence upon air borne sound detected by the transducer, means on the body for receiving the air borne sound for communication to the transducer, means for mounting the body relative to the respective nozzle such that the receiving means of the body is positioned adjacent the spray pattern at a position downstream of the tip so as to be responsive to air borne sound emitted by the liquid spray exiting the nozzle, central detector means arranged to receive said electrical signals and to detect a deviation of any one of said electrical signals from a predetermined normal signal by a value greater than a predetermined value so as to detect a fault in the operation of the nozzle associated with said one of said signals, and display means for indicating said fault.

2. The invention according to claim 1 wherein said support body comprises a molded body member substantially wholly surrounding said transducer.

3. The invention according to claim 2 including means defining an elongate channel in said support body extending from said receiving means to said transducer.

4. The invention according to claim 3 wherein the channel is shaped such that the cross sectional area thereof decreases in a direction from said receiving means to said transducer so as to concentrate sound collected from said nozzle by said receiving means.

5. The invention according to claim 1 wherein said support body includes an attachment portion arranged for attachment to a nozzle cap of the nozzle.

6. The invention according to claim 5 wherein said support body is substantially of L-shape such that the receiving means is mounted on a projecting portion extending outwardly from the attachment portion substantially at right angles thereto so as to extend therefrom underneath the nozzle cap to lie directly alongside the nozzle tip.

7. The invention according to claim 5 wherein the attachment portion includes a slot therein for receiving a fin of the nozzle cap.

8. The invention according to claim 1 wherein said central detector means includes selector means for scanning each of said microphones in turn and for detecting said electrical signal therefrom.

9. The invention according to claim 8 wherein said central detector means is arranged to generate said predetermined normal signal by calculating an average of the electrical signal received from each of the microphones scanned in turn and is arranged to compare said predetermined normal signal with each of said electrical signals of said microphones in turn after calculation of said normal signal.

10. The invention according to claim 1 wherein said central detector means is arranged to detect the amplitude of the electrical signal at a specific selected frequency and to compare said amplitude of said detected signal with the amplitude at said frequency of said predetermined normal signal.

11. The invention according to claim 10 wherein each of said nozzles has a nozzle tip thereon which can be replaced to generate a required spray pattern and wherein said central detector means is arranged to detect the amplitude of the electrical signal at one of a plurality of alternative frequencies and includes means for selecting for different nozzle tips one of said alternative frequencies.

12. The invention according to claim 11 wherein said means for selecting is arranged to detect the amplitude at each of said plurality of frequencies and to select that frequency with the greater amplitude.

13. The invention according to claim 1 wherein said central detector means is arranged to detect a deviation less than said predetermined value and greater than a predetermined smaller value and to display on said display means said detected deviation so as to provide an indication of inconsistency in said nozzles and microphones.

14. A field sprayer comprising a container for a liquid to be sprayed, vehicle means supporting the container for transport across the ground, a plurality of spray nozzles, a boom means carried by said vehicle means supporting said nozzles in spaced position transversely of a direction of working movement of the vehicle means, liquid supply means for communicating said liquid from said container to each of said spray nozzles each said spray nozzle having a nozzle tip arranged to generate a liquid spray pattern which projects from the nozzle tip in a spray direction, said apparatus and an apparatus for detecting faulty operation of at least one of the nozzles, the apparatus comprising a plurality of microphones, each microphone comprising a support body, a transducer mounted in said body and arranged to generate electrical signals in dependence upon air borne sound detected by the transducer, means on the body for receiving the air borne sound for communication to the transducer, means for mounting the body relative to the respective nozzle such that the receiving means of the body is positioned adjacent the spray pattern at a position downstream of the tip so as to be responsive to air borne sound emitted by the liquid spray exiting the nozzle, central detector means arranged to receive said electrical signals and to detect a deviation of any one of said electrical signals from a predetermined normal signal by a value greater than a predetermined value so as to detect a fault in the operation of the nozzle associated with said one of said signals, and display means for indicating said fault.

15. The invention according to claim 14 wherein said support body comprises a molded body member substantially wholly surrounding said transducer.

16. The invention according to claim 15 including means defining an elongate channel in said support body extending from said receiving means to said transducer.

17. The invention according to claim 16 wherein the channel is shaped such that the cross sectional area thereof decreases in a direction from said receiving means to said transducer so as to concentrate sound collected from said nozzle by said receiving means.

18. The invention according to claim 14 wherein said support body includes an attachment portion arranged for attachment to a nozzle cap of the nozzle.

19. The invention according to claim 18 wherein said support body is substantially of L-shape such that the receiving means is mounted on a projecting portion extending outwardly from the attachment portion substantially at right angles thereto so as to extend therefrom underneath the nozzle cap to lie directly alongside the nozzle tip.

20. The invention according to claim 18 wherein the attachment portion includes a slot therein for receiving a fin of the nozzle cap.

21. A method of detecting faulty operation of a spray nozzle in which the spray nozzle has a nozzle tip arranged to generate a liquid spray pattern projecting outwardly from the nozzle tip, the method comprising providing a microphone having a transducer of a type which generates electrical signals in dependence upon air borne sound detected by the transducer in a support body, providing on the support body means for receiving the air borne sounds, mounting the body relative to the nozzle such that the receiving means is positioned adjacent the spray pattern downstream of the nozzle tip so as to be responsive to the air borne sound emitted by the liquid spray exiting the nozzle, and detecting from said electrical signals a deviation thereof from a predetermined normal signal greater than a predetermined value so as to detect a fault in the operation of the nozzle.

22. The method according to claim 21 including providing a plurality of microphones, each mounted adjacent a respective one of a plurality of nozzles, and centrally detecting said electrical signals generated by said microphones.

23. The method according to claim 22 including scanning each of said microphones in turn and detecting said electrical signal therefrom.

24. The method according to claim 23 including generating said predetermined normal signal by calculating an average of the electrical signals received from each of the microphones scanned in turn and comparing said predetermined normal signal with each of said electrical signals of said microphones in turn after calculation of said predetermined normal signal.

25. The method according to claim 22 including detecting a deviation less than said predetermined value and greater than a predetermined smaller value and displaying said detected deviation so as to provide an indication of inconsistency in said nozzles and microphones.

26. The method according to claim 21 including detecting the amplitude of the electrical signals from the microphone at a specific selected frequency and comparing said amplitude of said detected signal with the amplitude at said frequency of said predetermined normal signal.

27. The method according to claim 21 wherein said nozzle has a nozzle tip thereon which can be replaced to generate a required spray pattern, including the step of detecting the amplitude of the electrical signal at one of a plurality of alternative frequencies and selecting for different nozzle tips one of said alternative frequencies.

28. The method according to claim 27 including detecting the amplitude at each of said plurality of frequencies and selecting that frequency with the greater amplitude.

* * * * *